(12) United States Patent
Silverbrook

(10) Patent No.: US 6,412,914 B1
(45) Date of Patent: *Jul. 2, 2002

(54) NOZZLE ARRANGEMENT FOR AN INK JET PRINTHEAD THAT INCLUDES A HINGED ACTUATOR

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/874,768

(22) Filed: Jun. 5, 2001

Related U.S. Application Data

(63) Continuation-in-part of application No. 09/113,068, filed on Jul. 10, 1998, now Pat. No. 6,254,220.

(30) Foreign Application Priority Data

Jul. 15, 1997 (AU) .............................................. PO7991
Jul. 15, 1997 (AU) .............................................. PO8033

(51) Int. Cl.[7] ........................... B41J 2/015; B41J 2/135; B41J 2/14; B41J 2/04
(52) U.S. Cl. .............................. 347/54; 347/20; 347/44; 347/47
(58) Field of Search ............................ 347/20, 44, 47, 347/54, 68

(56) References Cited

U.S. PATENT DOCUMENTS 5,612,723 A    3/1997  Shimura et al.
6,220,694 B1 *  4/2001  Silverbrook .................. 347/54

FOREIGN PATENT DOCUMENTS

| EP | 0416540 A2 * | 3/1991 | .................. 347/68 |
| JP | 403153359 A | 7/1991 | |
| JP | 404001051 A * | 1/1992 | .................. 347/54 |

* cited by examiner

*Primary Examiner*—John Barlow
*Assistant Examiner*—An H. Do

(57) ABSTRACT

A nozzle arrangement for an ink jet printhead that is manufactured in accordance with an integrated circuit fabrication technique includes a substrate. An actuator is arranged on the substrate to facilitate ejection of ink from a nozzle chamber of the nozzle arrangement. The actuator includes a working member that is displaceable with respect to the substrate. A flexible connector is arranged between the working member and the substrate to connect the working member hingedly to the substrate. An actuating mechanism is operatively arranged with respect to the working member to displace the working member relative to the substrate. The flexible connector is bendable to accommodate hinged movement of the working member when under influence of the actuating mechanism.

9 Claims, 4 Drawing Sheets

NOZZLE ARRANGEMENT FOR AN INK JET PRINTHEAD THAT INCLUDES A HINGED ACTUATOR

RELATED US APPLICATIONS

This application is a continuation-in-part application of Ser. No. 09/113,068, filed Jul. 10, 1998, now U.S. Pat. No. 6,254,220. U.S. Pat. Nos. 6,254,220, 6,238,040 and 6,220,694 are hereby incorporated by reference.

FIELD OF THE INVENTION

This invention relates to ink jet printheads. More particularly, this invention relates to a nozzle arrangement for an ink jet printhead that includes a hinged actuator.

BACKGROUND OF THE INVENTION

The Applicant has invented an ink jet printhead that is capable of generating text and images at a resolution of up to 1600 dpi.

In order to achieve this, the Applicant has made extensive use of micro electro-mechanical systems technology. In particular, the Applicant has developed integrated circuit fabrication techniques suitable for the manufacture of such printheads.

The printheads developed by the Applicant can include up to 84000 nozzle arrangements. Each nozzle arrangement has at least one moving component which serves to eject ink from a nozzle chamber. These components usually either act directly on the ink or act on a closure which serves to permit or inhibit the ejection of ink from the nozzle chamber.

The printheads are manufactured in accordance with an integrated circuit fabrication technique. It follows that the moving components are microscopically dimensioned. This is necessary, given the large number of nozzles per printhead. Applicant has found that it has been relatively easy to generate sufficient energy of movement in the components. However, Applicant has found that it has been difficult to achieve a range of movement sufficient for effective functioning of the nozzle arrangements. The reason for this is that the materials and the manner of manufacture place a number of constraints on the nozzle arrangements.

Those with ordinary skill in the field of circuit fabrication technology will appreciate that such fabrication is generally a process of deposition and etching selected materials. As such, components manufactured in accordance with such processes are often in a layered form. Further, it is important, where possible, to achieve a monolithic structure. It follows that movement of the components usually involves the temporary deformation of one or more of the components. In many of the Applicant's inventions, this deformation occurs as a result of a bending of these components. This can place substantial limitations on a range of movement necessary for the component to work efficiently, if at all.

The Applicant has conceived the present invention to address these difficulties. In particular, the Applicant has addressed the problem of achieving a sufficient span of movement for the components to function at a suitable level of efficiency.

SUMMARY OF THE INVENTION

According to a first aspect of the invention, there is provided a nozzle arrangement for an ink jet printhead that is manufactured in accordance with an integrated circuit fabrication technique, the nozzle arrangement comprising a substrate;

an actuator that is arranged on the substrate to facilitate ejection of ink from a nozzle chamber of the nozzle arrangement, the actuator comprising a working member that is displaceable with respect to the substrate;

a flexible connector that is arranged between the working member and the substrate to connect the working member hingedly to the substrate; and an actuating mechanism that is operatively arranged with respect to the working member to displace the working member relative to the substrate, the flexible connector being bendable to accommodate hinged movement of the working member when under influence of the actuating mechanism.

According to a second aspect of the invention, there is provided an ink jet printhead that is manufactured in accordance with an integrated circuit fabrication technique, the ink jet printhead comprising a substrate;

at least one nozzle arrangement positioned on the substrate, the, or each nozzle arrangement comprising an actuator that is arranged on the substrate to facilitate ejection of ink from a nozzle chamber of the, or each, nozzle arrangement, the actuator comprising a working member that is displaceable with respect to the substrate; and a flexible connector that is arranged between the working member and the substrate to connect the working member hingedly to the substrate; and an actuating mechanism that is operatively arranged with respect to the working member to displace the working member relative to the substrate, the flexible connector being bendable to accommodate hinged movement of the working member when under influence of the actuating mechanism.

The invention is described below with reference to the accompanying drawings. The following description is for illustrative purposes only and is not intended to limit the broad scope of this summary.

BRIEF DESCRIPTION OF THE DRAWINGS

In the drawings,

In FIG. 1, reference numeral 10 generally indicates a nozzle arrangement, in accordance with the invention, for an ink jet printhead manufactured in accordance with an integrated circuit fabrication technique.

Figure 1:
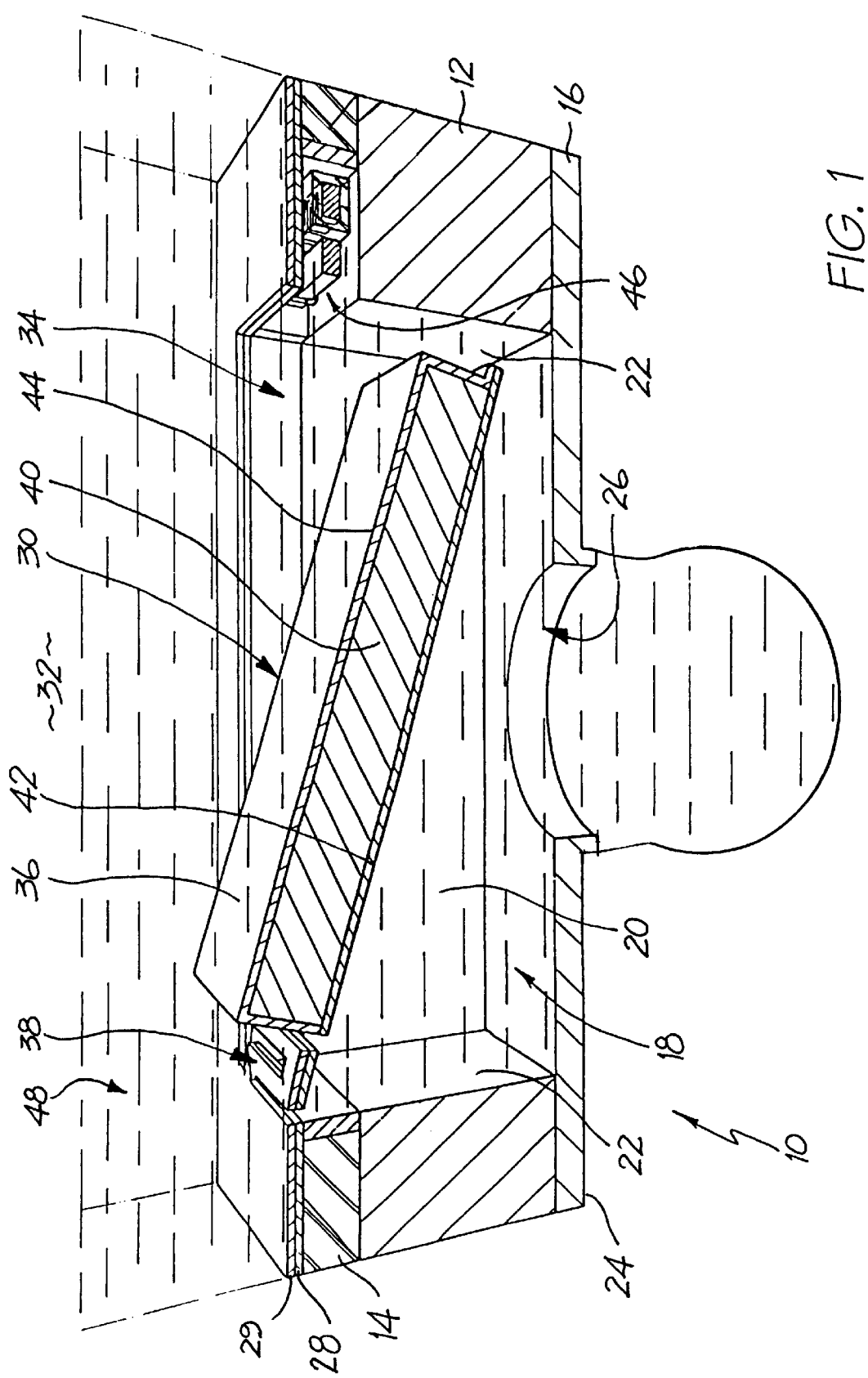
FIG. 1 shows a sectioned, three dimensional view of a first embodiment of a nozzle arrangement, in accordance with the invention, for an ink jet printhead manufactured in accordance with an integrated circuit fabrication technique.

The nozzle arrangement 10 includes a wafer substrate 12. A drive circuitry layer 14 is positioned on one side of the wafer substrate 12 and incorporates drive circuitry. A pair of passivation layers 28, 29 are formed on the drive circuitry layer 14. An etch stop layer 16 is positioned on an opposite side of the wafer substrate 12. A nozzle chamber 18 is defined in the wafer substrate 12, the drive circuitry layer 14 and the passivation layers 28, 29 as a result of an etching process carried out up to the etch stop layer 16. The nozzle chamber 18 has a rectangular cross section. Thus, the wafer substrate 12 and the layers 14, 28 define a pair of opposed major walls 20 and a pair of opposed minor walls 22. The etch stop layer 16 defines a roof wall 24. The roof wall 24 is etched to define an ink ejection port 26.

The nozzle chamber 18 is etched to define an inlet 30 so that the nozzle chamber 18 is in fluid communication with an ink reservoir, indicated generally at 32.

The nozzle arrangement 10 includes an actuator 34 for ejecting ink 48 from the ink ejection port 26. The actuator 34 includes a working member in the form of a paddle 36 that is displaceable towards and away from the ink ejection port 26 to eject the ink 48 from the ink ejection port 26.

The nozzle arrangement 10 includes a flexible connector 38 that is fast with the passivation layers 28, 29. The paddle 36 is hingedly attached to the passivation layers 28, 29 via the flexible connector 38.

As set out above, the nozzle arrangement 10 is manufactured in accordance with an integrated circuit fabrication technique. It will be appreciated by those of ordinary skill in the art that such techniques involve what is essentially a strictly controlled deposition and etching process. It follows that the nozzle arrangement 10 is a layered structure.

The flexible connector 38 is thus defined by the two layers 28, 29 when the two layers 28, 29 are etched during fabrication of the nozzle arrangement 10. In particular, the flexible connector 38 extends from one of the minor walls 22.

The paddle 36 is substantially rectangular to correspond with the shape of the nozzle chamber 18 and to span the inlet 30, the paddle 36 extending between the minor walls 22.

In use, the printhead is subjected to a cyclical magnetic field. The paddle 36 has a core 40 of a magnetic material. The polarity and strength of the magnetic core 40 is such that the paddle 36 is responsive to the cyclical magnetic field to undergo reciprocal movement towards and away from the ink ejection port 26. The core 40 is coated with a pair of opposed passivation layers 42, 44. The passivation layer 42 forms part of the passivation layer 28, while the passivation layer 44 forms part of the passivation layer 29. It follows that the passivation layers 28, 29, the connector 38 and the passivation layers 42, 44 define a common layered structure, with the magnetic core 40 positioned between the layers 42, 44.

The passivation material can be of any material which is suitable for repeated flexure. An example of such a material is silicon nitride. It will be appreciated that the material should be selected to be both flexible and to be suitable for protecting or passivating the drive circuitry layer 14.

The actuator 34 includes an obstruction mechanism 46 that is positioned in the minor wall 22 opposed to that from which the paddle 36 extends. The obstruction mechanism 46 is operable on a signal received from the drive circuitry in the layer 14 to extend from that wall 22 to obstruct movement of the paddle 36. This serves to inhibit the ejection of the ink 48 from the ink ejection port 26. It follows that, by controlling operation the obstruction mechanism 46, via a suitable control system connected to the drive circuitry layer 14, selective drop ejection from the ink ejection port 26 can be achieved.

Figure 2:
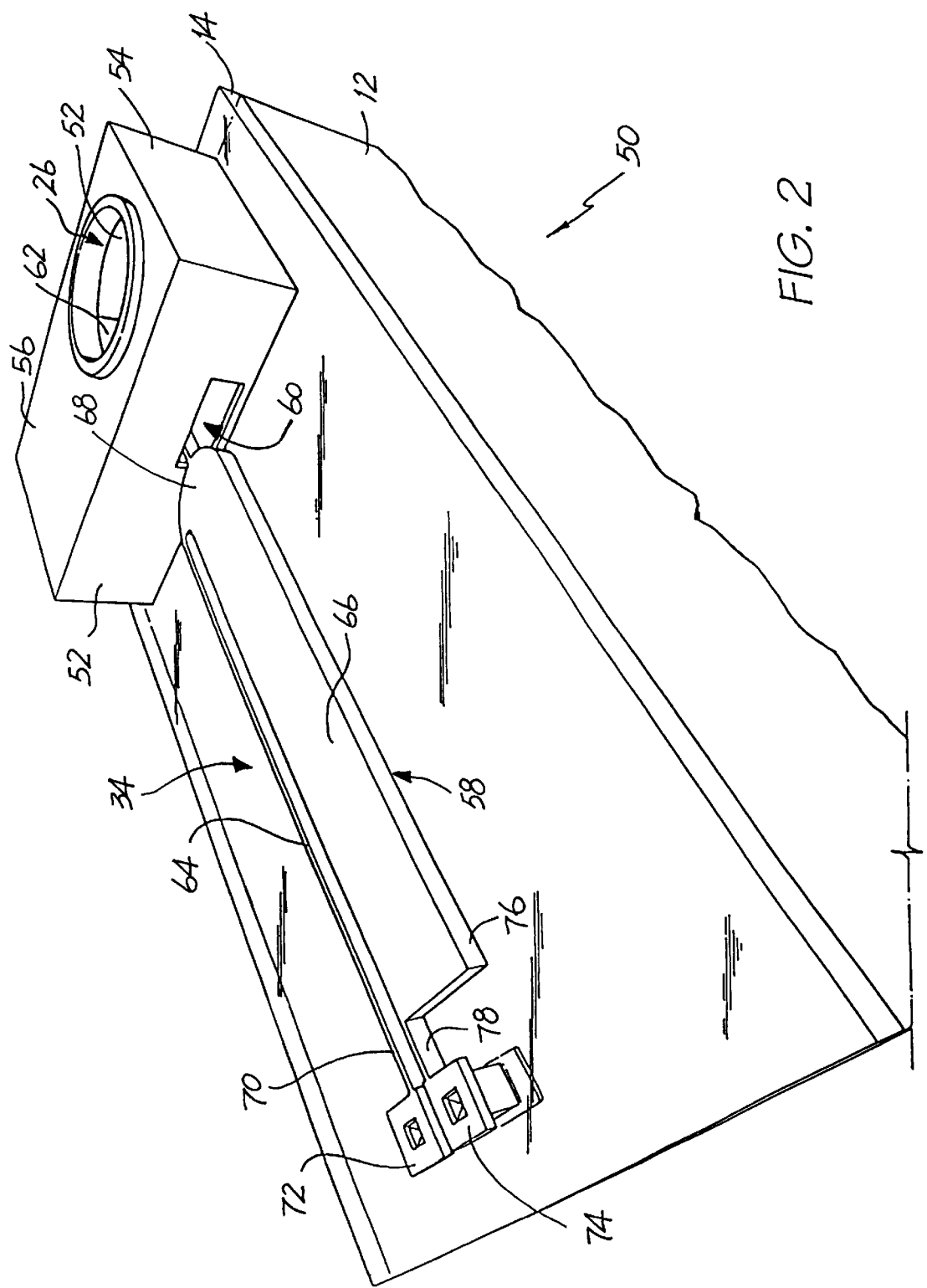
FIG. 2 shows a three dimensional view of a second embodiment of a nozzle arrangement, in accordance with the invention, for an ink jet printhead manufactured in accordance with an integrated circuit fabrication technique, in an inoperative condition.
Figure 3:
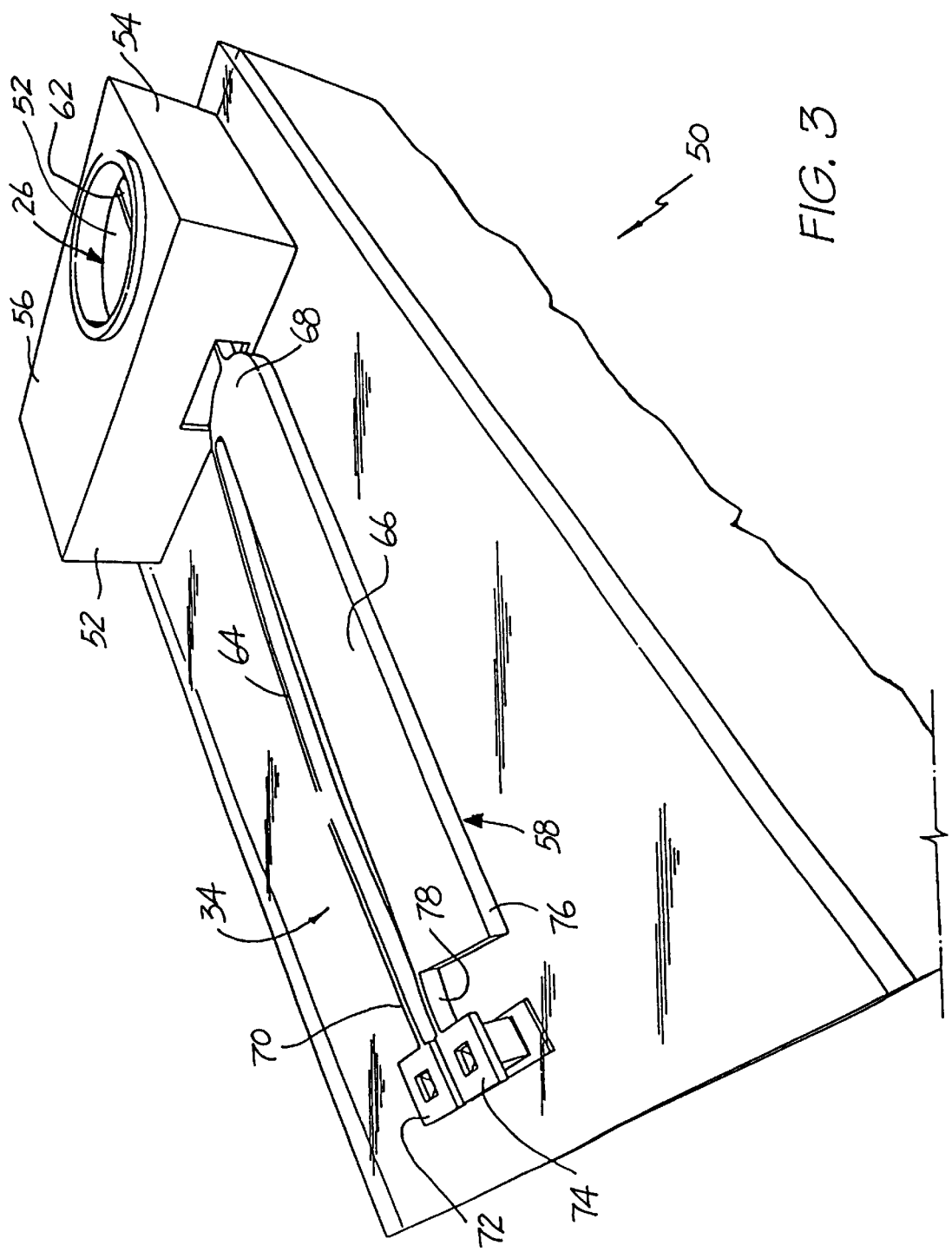
FIG. 3 shows the nozzle arrangement of FIG. 2 in an operative condition.

In FIGS. 2 and 3, reference numeral 50 generally indicates a second embodiment of a nozzle arrangement, in accordance with the invention, for use with an ink jet printhead manufactured in accordance with an integrated circuit fabrication technique. With reference to FIG. 1, like reference numerals refer to like parts, unless otherwise specified.

The nozzle arrangement 50 includes a pair of opposed major nozzle chamber walls 52 and a pair of opposed minor nozzle chamber walls 54 that extend from the drive circuitry layer 14 to define the nozzle chamber 18. A roof wall 56 is positioned on the nozzle chamber walls 52, 54 to define a roof of the nozzle chamber 18 and the ink ejection port 26.

The actuator 34 of the nozzle arrangement 50 includes a paddle arm 58, which extends through a slot 60 defined in one of the major walls 52. A paddle 62 is mounted on the paddle arm 58 and is positioned in the nozzle chamber 18.

The ink ejection port 26 is defined proximate one of the minor walls 54. The paddle arm 58 is displaceable with respect to the drive circuitry layer 14 to displace the paddle 62 between an inoperative position (FIG. 2) and an operative position (FIG. 3). In the inoperative position, the paddle 62 is spaced from the minor wall 54 proximate the ejection port 26 and in the operative position, the paddle 62 is proximate that minor wall 54. Further, the paddle 62 is oriented and is dimensioned to correspond generally with a minor transverse cross sectional area of the nozzle chamber 18. It will therefore be appreciated that, as the paddle 62 moves from its inoperative position to its operative position, the paddle 62 sweeps through the nozzle chamber 18 to eject the ink from the ink ejection port 26.

The paddle arm 58 is of a conductive material and comprises two spaced portions 64, 66. The portions 64, 66 are connected together at one end 68, which, in turn, is connected to the paddle 36. The paddle arm 58 is connected to a pair of adjacent vias 72, 74 which serve to connect the paddle arm 58 to drive circuitry within the layer 14. An opposed end 70 of the portion 64 is connected to the via 72.

A flexible connector 78 is connected between the via 74 and an opposed end 76 of the portion 66.

As with the previous embodiment, the nozzle arrangement 50 is formed in what is generally a deposition and etching process. It follows that the nozzle arrangement 50 also defines a generally layered structure. Thus, the paddle arm 58 is generally planar with the paddle 62, the paddle arm 58, the flexible connector 78 and the vias 72, 74 being of the same material which is deposited and subsequently etched to define these components.

As can be seen in the drawings, the portion 64 is substantially thinner than the portion 66. Further, the portion 64 extends the length of the portion 66. The flexible connector 78 is substantially shorter than both the portions 64, 66. Further, the dimensions of the portion 66 result in a hinged movement of the portion 66 being accommodated by a bending of the flexible connector 78.

The conductive material of the paddle arm 58 has a coefficient of thermal expansion which is such that work can be performed as a result of expansion of the material upon heating. For example, the conductive material can be in the form of a material such as titanium di-boride ($TiB_2$). Such material has a sufficiently high Young's modulus to ensure that the material can return to an original condition once the material cools down after having been thermally expanded.

The portion 64 is configured to be resistively heated when an electrical current is set up by the drive circuitry in the paddle arm 58. This results in an expansion of the portion 64. The portion 66 is configured so that it undergoes very little heating relative to the portion 64. The expansion of the portion 64 and the stability of the portion 66 results in the portion 64 expanding and bending to act on the portion 66 to urge the paddle arm 58 into its operative position. The portion 66 is thus displaced hingedly while this displacement is accommodated by a bending of the flexible connector 78. Upon a discontinuation of the electrical current and subsequent cooling of the portion 64, the portion 64 contracts and bends back into its starting condition under tension that is built up in the portion 64 as a result of the Young's modulus of the conductive material. This return movement is accommodated by a bending of the flexible connector 78.

It will therefore be appreciated that the configuration of the flexible connector 78 facilitates the hinged movement of the paddle arm 58.

Figure 4:
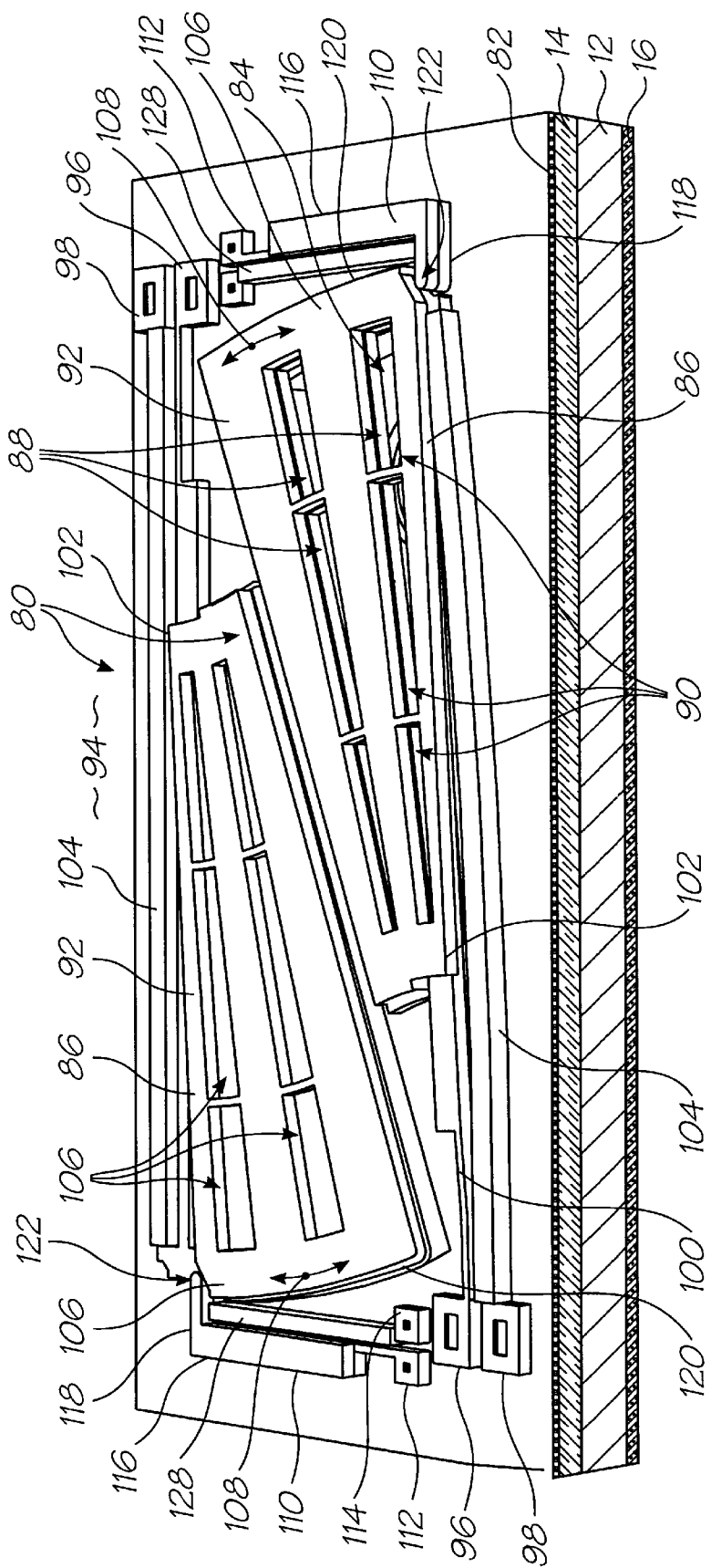
FIG. 4 shows a partly sectioned, three dimensional view of a third embodiment of a nozzle arrangement, in accordance with the invention, for an ink jet printhead, manufactured in accordance with an integrated circuit fabrication technique.

In FIG. 4, reference numeral 80 generally indicates a third embodiment of a nozzle arrangement, in accordance with the invention, for an ink jet printhead. With reference to FIGS. 1 to 3, like reference numerals refer to like parts, unless otherwise specified.

In FIG. 4, a pair of nozzle arrangements 80 are shown. This illustrates the manner in which the nozzle arrangements 80 are positioned with respect to each other to define a printhead.

The nozzle arrangement 80 includes a substrate which incorporates the etch stop layer 16, the wafer substrate 12, the drive circuitry layer 14 and a passivation layer 82 positioned on the drive circuitry layer 14. As with the nozzle arrangement 10, the nozzle chamber 18 is formed in the wafer substrate 12, with the etch stop layer 16 defining the ink ejection port 26. The passivation layer 82 is etched to define an inlet 84 of the nozzle chamber 18. In particular, the passivation layer 82 is etched to define a number of inlet openings 88 which together define the inlet 84.

The nozzle arrangement 80 includes a shutter member 86 which is displaceable, relative to the wafer substrate 12 between open and closed positions. The shutter member 86 includes a shutter 92 which has a number of openings 90 defined therein. Each opening 90 of the shutter 92 corresponds with a respective inlet opening 88. Further, the shutter 92 is shaped so that, when the shutter 92 moves into its closed position, the openings 88, 90 are completely out of register so that ink is inhibited from passing through the inlet openings 88 and into the nozzle chamber 18. When the shutter 92 moves into its open position, the openings 88, 90 are substantially in register so that ink is permitted to flow through the inlet openings 88 into the nozzle chamber 18.

The shutter members 86 are positioned in a reservoir, indicated generally at 94. Ink within the reservoir 94 is pressurized in a pulsed manner to an extent sufficient to eject ink from the ink ejection port 26. Thus, by controlling operation of the shutter member 86, selective ejection of ink can be achieved.

A pair of vias 96, 98 are positioned on the passivation layer 82 in electrical connection with the drive circuitry layer 14. The vias 96, 98 are positioned in an adjacent, side-by-side manner. A flexible connector 100 is connected between, and is fast with, the via 96 and a proximal end 102 of the shutter 92. Thus, the shutter 92 is displaceable, in a hinged manner, between the open and closed positions, with the flexible connector 100 bending to accommodate this movement.

The shutter member 86 includes an actuator arm 104, which is connected, at one end, to the via 98 and, at an opposite end, to a distal end 106 of the shutter 92.

The printhead is manufactured in accordance with what is generally a deposition and etching process. As a result, the nozzle arrangement 80 has a layered configuration, each layer comprising a selected material. In this embodiment, the vias 96, 98 and the shutter member 86 are formed in layers. The material of these layers is conductive and has a coefficient of thermal expansion which is sufficiently high so that work can be harnessed from expansion of the material on the application of heat. Still further, the material is selected to have a Young's modulus which is such that the shutter member 86 can return to an original condition after having being displaced through the application of heat.

It will be appreciated that the shutter member 86 defines an electrical circuit with current flowing from one of the vias 96, 98 to the other, in use.

The actuator arm 104 incorporates a resistive heating mechanism such as a resistive core (not shown) which heats when a current is passed through the core. The shutter 92 and the actuator arm 104 are configured so that the shutter does not undergo any significant heating as a result of a current which serves to heat the actuator arm 104. This can be achieved in a number of ways. For example, as set out in the referenced applications, the actuator arm 104 can include a thermal insulating jacket positioned about the resistive core to ensure that the actuator arm 104 retains heat and therefore expands, while heat is dissipated from the shutter 92.

Expansion of the actuator arm 104 results in the actuator arm 104 acting on the shutter 92 so that the shutter 92 is urged in the direction shown by an arrow 108 into the open position which is that shown in the drawings. It will be appreciated that this hinged movement of the shutter 92 is accommodated by a bending of the flexible connector 100.

The nozzle arrangement 80 includes a catch mechanism 110. The catch mechanism 110 is positioned on the passivation layer 82 and includes a pair of vias 112, 114 arranged on the passivation layer 82 and electrically connected to the drive circuitry layer 14. The catch mechanism 110 includes a catch arm 116 having a catch formation 118 defined thereon. The catch arm 116 is positioned so that the catch formation 118 bears against a distal end surface 120 of the shutter 92 while the shutter 92 moves between the open and closed positions. The distal end surface 120 defines a complementary catch formation 122 which is positioned to engage the catch formation 118 when the shutter 92 is in its open position so that the shutter 92 can be retained in its open position.

As with the shutter member 86, the catch arm 116 is connected to the vias 112, 114 with a flexible connector 124. Thus, the flexible connector 124 is configured to bend to accommodate hinged movement of the catch arm 112 in the direction of an arrow 126. An actuator arm 128 is connected between the via 114 and a distal end of the catch arm 116. The actuator arm 128 and the catch arm 112 are configured so that, when a current from the drive circuitry is applied to the catch mechanism, via the vias 112, 114, the actuator arm 128 expands while the catch arm remains stable. This results in a hinged displacement of the catch arm 112 and thus the catch formation 122 away from the distal end surface 120 of the shutter 92. Thus, the catch mechanism 110 can be selectively operated to release the shutter 92 so that the shutter 92 can return to its closed position under tension built up in the shutter member 86 and an a result of the contraction of the actuator arm 104.

It follows that movement of the shutter 92 between its open and closed positions can be controlled with a suitable control system that is connected to the drive circuitry layer 14.

Applicant believes that the provision of the flexible connector in the above examples is extremely beneficial in that an accurate hinged movement of a component in a nozzle arrangement of the type described can be achieved. In particular, by concentrating a bending movement in the flexible connector, a suitable amplification of motion can be achieved. As set out earlier, this has been identified as a desirable objective in such nozzle arrangements.

I claim:

1. A nozzle arrangement for an ink jet printhead that is manufactured in accordance with an integrated circuit fabrication technique, the nozzle arrangement comprising
   a substrate; and
   an actuator that is arranged on the substrate to facilitate ejection of ink from a nozzle chamber of the nozzle arrangement, the actuator comprising
      a working member that is displaceable with respect to the substrate;
      a flexible connector that is arranged between the working member and the substrate to connect the working member hingedly to the substrate; and
      an actuating mechanism that is operatively arranged with respect to the working member to displace the working member relative to the substrate, the flexible connector being bendable to accommodate hinged movement of the working member when under influence of the actuating mechanism.

2. A nozzle arrangement as claimed in claim 1, which is in the form of a micro electro-mechanical system.

3. A nozzle arrangement as claimed in claim 1, in which the flexible connector and at least a portion of the working member define common structures, with a cross sectional area of the flexible connector being substantially less than that of the working member.

4. A nozzle arrangement as claimed in claim 1, in which the substrate includes a wafer substrate and a drive circuitry layer positioned on the wafer substrate.

5. A nozzle arrangement as claimed in claim 1, which includes nozzle chamber walls that define the nozzle chamber, one of the walls being in the form of a roof wall which defines a roof of the nozzle chamber and an ink ejection port from which ink is ejected, in use.

6. A nozzle arrangement as claimed in claim 5, in which the working member includes a paddle member which is received in the nozzle chamber, to act on the ink within the nozzle chamber to eject the ink from the ink ejection port.

7. A nozzle arrangement as claimed in claim 5, in which the substrate defines an inlet to the nozzle chamber so that the nozzle chamber can be in fluid communication with an ink supply that is repeatedly pressurised to an extent sufficient to eject ink from the nozzle chamber, the working member including a closure member which is displaceable to close or open the inlet, on demand.

8. A nozzle arrangement as claimed in claim 1, in which the connector is of a resilient material so that, once the working member is displaced by the actuating mechanism, the working member can return to a starting condition under tension in the connector.

9. An ink jet printhead that is manufactured in accordance with an integrated circuit fabrication technique, the ink jet printhead comprising
   a substrate; and
   at least one nozzle arrangement positioned on the substrate, the, or each nozzle arrangement comprising
      an actuator that is arranged on the substrate to facilitate ejection of ink from a nozzle chamber of the, or each, nozzle arrangement, the actuator comprising
         a working member that is displaceable with respect to the substrate;
         a flexible connector that is arranged between the working member and the substrate to connect the working member hingedly to the substrate; and
         an actuating mechanism that is operatively arranged with respect to the working member to displace the working member relative to the substrate, the flexible connector being bendable to accommodate hinged movement of the working member when under influence of the actuating mechanism.

* * * * *